United States Patent [19]

Kobayashi et al.

[11] 4,321,901

[45] Mar. 30, 1982

[54] AUTOMATIC SPEED CONTROL DEVICE

[75] Inventors: Kyoji Kobayashi, Chigasaki; Yujiro Tsutsui, Kamakura; Noboru Kaneko, Yokohama; Ekiro Hidaka; Kiyoshi Konishi, both of Fujisawa; Toshio Iwaoka, Yokohama, all of Japan

[73] Assignee: Jidosha Denki Kogyo Kabushiki Kaisha, Yokohama, Japan

[21] Appl. No.: 173,246

[22] Filed: Jul. 29, 1980

[30] Foreign Application Priority Data

Aug. 3, 1979 [JP] Japan .................................. 54-98695
Aug. 3, 1979 [JP] Japan .................................. 54-98696

[51] Int. Cl.[3] ....................... G05D 13/62; B60k 31/00; F02D 11/10

[52] U.S. Cl. .................................... 123/352; 123/351; 123/357; 180/170; 361/236

[58] Field of Search ............... 123/352, 350, 349, 357, 123/376, 351; 180/170, 176, 177, 178, 179; 361/236, 239, 240, 242

[56] References Cited

U.S. PATENT DOCUMENTS 3,752,252 8/1973 Sakakibara .......................... 123/351
3,767,972 10/1973 Noddings et al. .................. 123/351
3,804,193 4/1974 Ikuta .................................. 180/170
3,885,137 5/1975 Ooya et al. .......................... 123/352
3,886,915 6/1975 Taplin ................................ 123/357
3,952,829 4/1976 Gray .................................. 123/352
4,086,888 5/1978 Roberts .............................. 361/236
4,196,466 4/1980 Noddings et al. .................. 123/352

*Primary Examiner*—Raymond A. Nelli
*Attorney, Agent, or Firm*—Sughrue, Mion, Zinn, Macpeak and Seas

[57] ABSTRACT

An automatic speed control device for a vehicle or a stationary generator for emergency use is disclosed. The device comprises a speed signal detector means for generating speed pulses of a frequency proportional to a speed, a constant time generator means connected to the detector, a speed pulse counter means for counting the speed pulses received within the constant time, an auxiliary pulse generator means for generating auxiliary pulses of a constant period from the leading edge of each speed pulse, an auxiliary pulse counter means for counting from the leading edge of each speed pulse auxiliary pulse of constant period sufficiently smaller than a period of the speed pulse at the highest speed, an actual speed computing means connected to both counters for computing an actual speed from the counted result of speed pulses at the end of the constant time and the counted result of auxiliary pulse, a setting speed memory means connected to the actual speed computing means, a speed comparator means for comparing the actual speed and the setting thereby to generate an output signal corresponding to the difference thereof, and an electromechanical transducer means connected to receive the output signal of actual speed computing means for driving an adjustable speed mechanism of a prime mover.

8 Claims, 12 Drawing Figures

AUTOMATIC SPEED CONTROL DEVICE

BACKGROUND OF THE INVENTION

The present invention relates to an automatic speed control device, particularly relates to an automatic speed control device suitable for controlling a running speed of a vehicle at a constant speed. The present invention further relates to an automatic speed control device suitable for performing a constant speed control of a prime mover in which load fluctuation is large, for example, a stationary emergency generator.

An automatic speed control device, particularly an automatic speed control device for controlling a speed of an automobile or vehicle at a constant speed has variously been considered. FIG. 1 is a diagrammatic view showing one embodiment of a conventional automatic speed control device for a vehicle. Reference numeral 1 is a speed signal detector for generating a pulse signals of a frequency proportional to a speed, reference numeral 2 is a speed signal generator for converting a pulse signal received from the speed signal detector 1 into a DC voltage signal proportional to a speed by an F-V converter (frequency-voltage converter), reference numeral 3 is a pulse generator for generating pulse signals of a certain or constant frequency, reference numeral 4 is a gate circuit for passing through the pulse signals to a counter 6 by turning on a set switch 5, and reference numeral 7 is a D-A converter for converting a counted result at the counter 6 into an analog voltage. During the turning on of the set switch 5, an output of the D-A converter 7 is compared with an output of the speed signal generator 2 in a comparator 8, and when both the outputs coincide with each other, the gate circuit 4 is closed by an output of the comparator 8 so as to stop the counting of pulse signals and the speed at the time is stored in the counter 6. Thereafter, a difference between the voltage output proportional to the actual speed from the speed signal generator 2 and the output generated by converting the set speed stored in the counter 6 into an analog voltage signal is compared and amplified in an error amplifier 9, further amplified by a power amplifier 10, and then supplied to a current-vacuum converter 11, so that the magnitude of a current from the amplifier 10 is converted into the magnitude of a vacuum from a vacuum source 12. The output of the current-vacuum converter 11 is supplied to a throttle valve 15 of a gasoline engine through a vacuum force converter 13 and a link mechanism 14, so that the valve 15 is opened or closed by the link 14 thereby to control the speed of a vehicle constant.

The above conventional device, however, has the following drawbacks.

(1) Since an F-V converter is used for the speed signal generator 2 and a D-A converter is used for converting a counted result of the counter 6, the speed measuring accuracy of a vehicle is insufficient.

(2) Because of a response characteristics of the F-V converter, when a speed is particularly slow and the frequency of a speed pulse is low, it is impossible to obtain a quick and precise response.

SUMMARY OF THE INVENTION

It is an object of the present invention to eliminate the above described disadvantages of the conventional automatic speed control device.

It is another object of the present invention provide an automatic speed control device which can remarkably improve the accuracy, make the response characteristics excellent and automatically perform delicate speed control by digital processing of the processes from the measurement of an actual speed to the arithmetic operation of a difference between the actual speed and the set speed.

According to the present invention an automatic speed control device comprises a speed signal detector means for generating speed pulses of a frequency proportional to a speed, a constant time generator means connected to the detector, a speed pulse counter means connected to the detector and the constant time generator for counting the speed pulses received within the constant time, an auxiliary pulse generator means connected to the speed signal detector and the speed pulse counter for generating auxiliary pulses of a constant period from the leading edge of each speed pulse, an auxiliary pulse counter means connected to the auxiliary pulse generator and the constant pulse generator for counting from the leading edge of each speed pulse auxiliary pulses of constant period sufficiently smaller than a period of the speed pulse at the highest speed, an actual speed computing means connected to both counters for computing an actual speed from the counted result of speed pulses at the end of the constant time and the counted result of the auxiliary pulses, a setting speed memory means connected to the actual speed computing means, a speed comparator means connected to the memory means and the actual speed computing means for comparing the actual speed and the setting speed thereby to generate an output signal corresponding to the difference thereof, and an electromechanical transducer means connected to receive the output signal of the actual speed computing means for driving an adjustable speed mechanism of a prime mover.

An automatic speed control device according to another aspect of the present invention comprises a speed signal detector means for generating speed pulses of a frequency proportional to a speed, a constant time generator means connected to the detector, a speed pulse counter means connected to the detector and the constant time generator for counting the speed pulses received within the constant time, an auxiliary pulse generator means connected to the speed signal detector and the speed pulse counter for generating auxiliary pulses of a period corresponding to the counted result of the speed pulses, an auxiliary pulse counter means connected to the auxiliary pulse generator and the constant pulse generator for counting auxiliary pulses generated at a period corresponding to the counted result of the speed pulses, an actual speed computing means connected to both counters for operating an actual speed from the counted result of the speed pulses at the end of the constant time and the counted result of the auxiliary pulses, a setting speed memory means connected to the actual speed computing means, a speed comparator means connected to the memory means and the actual speed computing means for comparing the actual speed and the setting speed thereby to generate an output signal corresponding to the difference thereof, and an electromechanical transducer means connected to receive the output signal of the actual speed computing means for driving an adjustable speed mechanism of a prime mover.

The adjustable speed mechanism of the prime mover is a throttle valve of a gasoline engine. The adjustable speed mechanism of the prime mover is a control rack of a diesel engine.

DESCRIPTION OF THE PREFERRED EMBODIMENT

Figure 1:
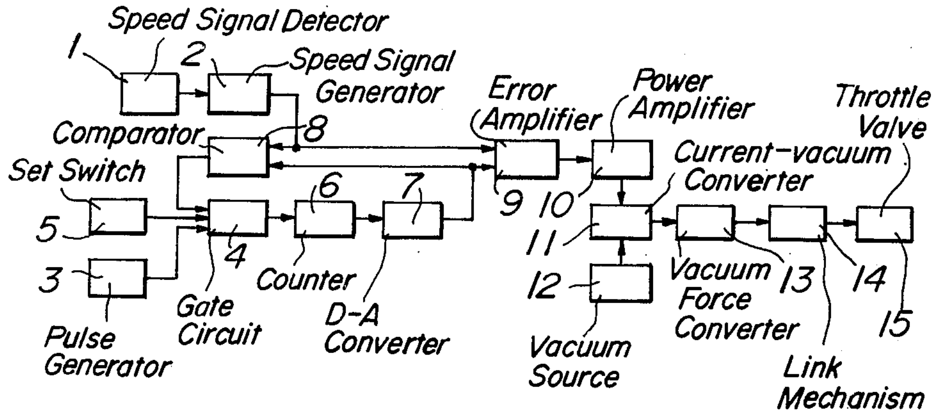
FIG. 1 PRIOR ART
FIG. 1 is a diagrammatic view showing one embodiment of a conventional automatic speed control device.

Referring now to the drawing one embodiment of an automatic speed control device according to the present invention will be explained.

Figure 2:
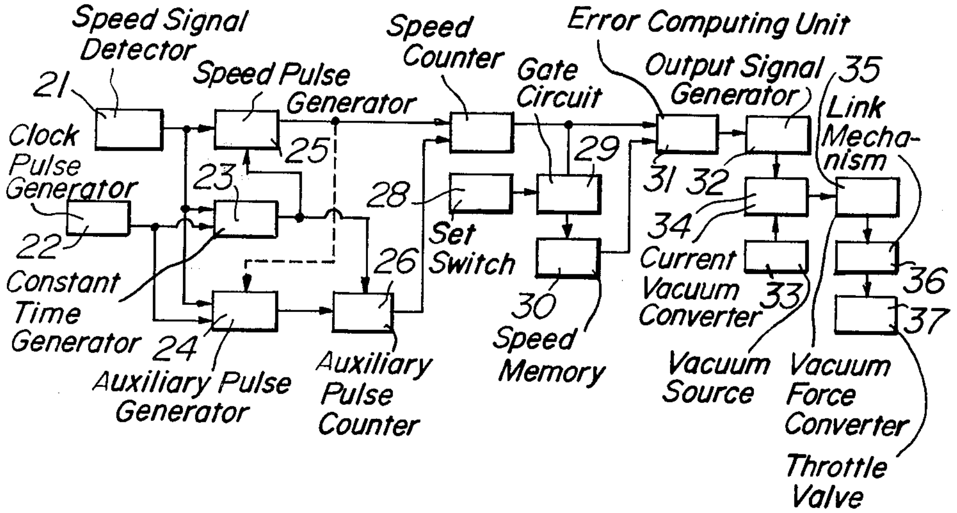
FIG. 2 is a diagrammatic view showing one embodiment of an automatic speed control device according to the present invention.

FIG. 2 is a schematic diagram of an automatic speed control device as one embodiment of the present invention, and particularly shows the case of applying the device to a vehicle on which a gasoline engine is mounted.

Figure 5:
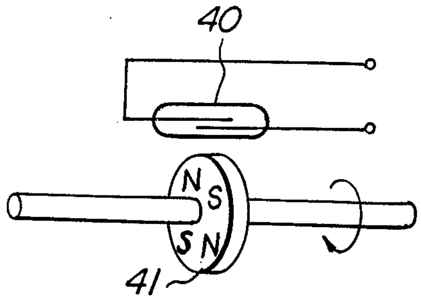
FIG. 5 is a perspective view showing a construction of a speed signal detector for use in the automatic speed control device according to the present invention.
Figure 6:
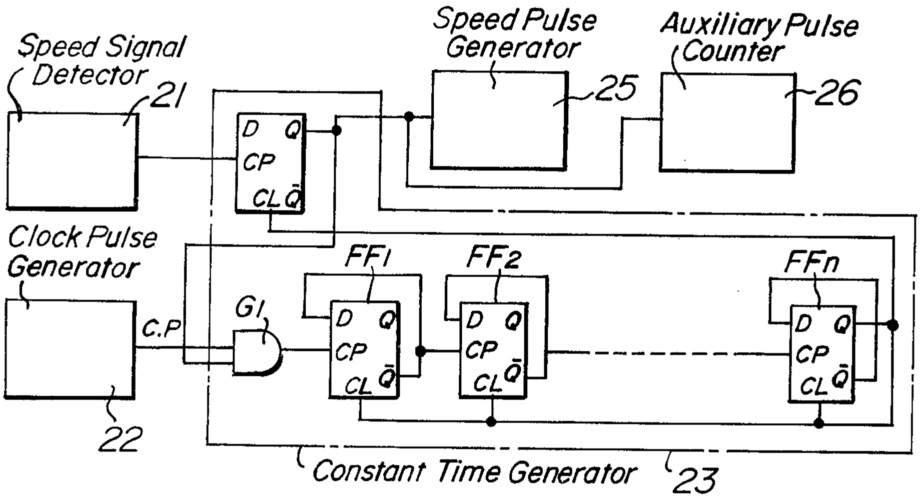
FIG. 6 is a schematic block diagram showing a construction of a constant time generator for use in the speed control device.
Figure 7:
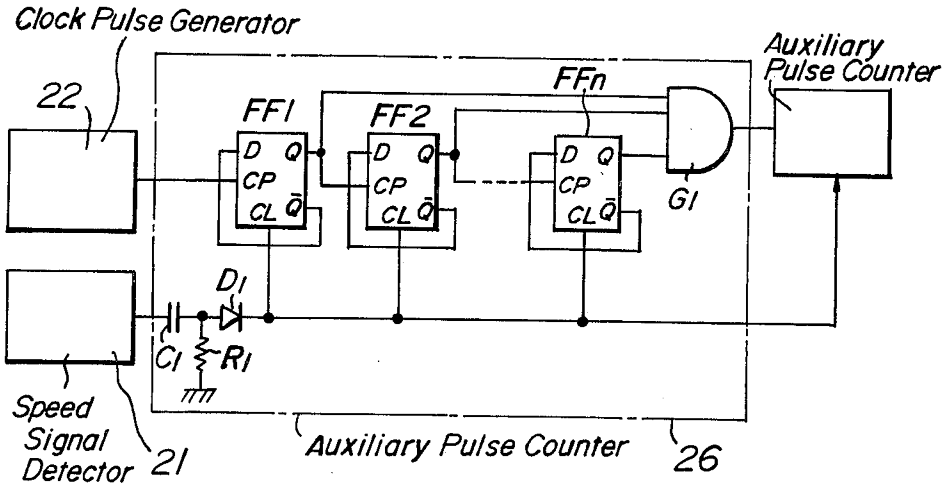
FIG. 7 is a schematic block diagram showing a construction of an auxiliary pulse generator for use in the speed control device.
Figure 8:
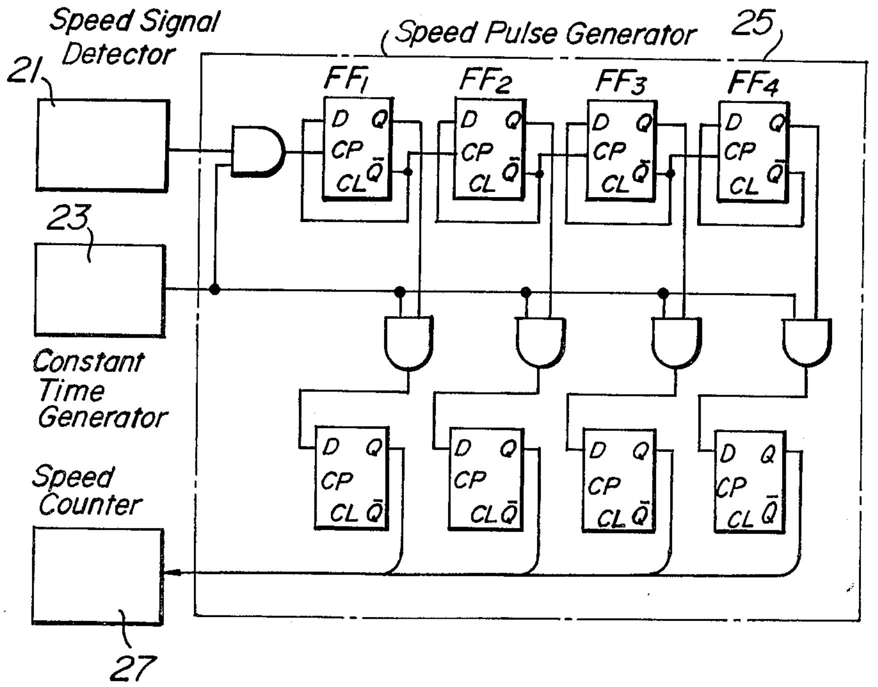
FIG. 8 is a schematic block diagram showing a construction of a speed pulse counter for use in the speed control device.
Figure 9:
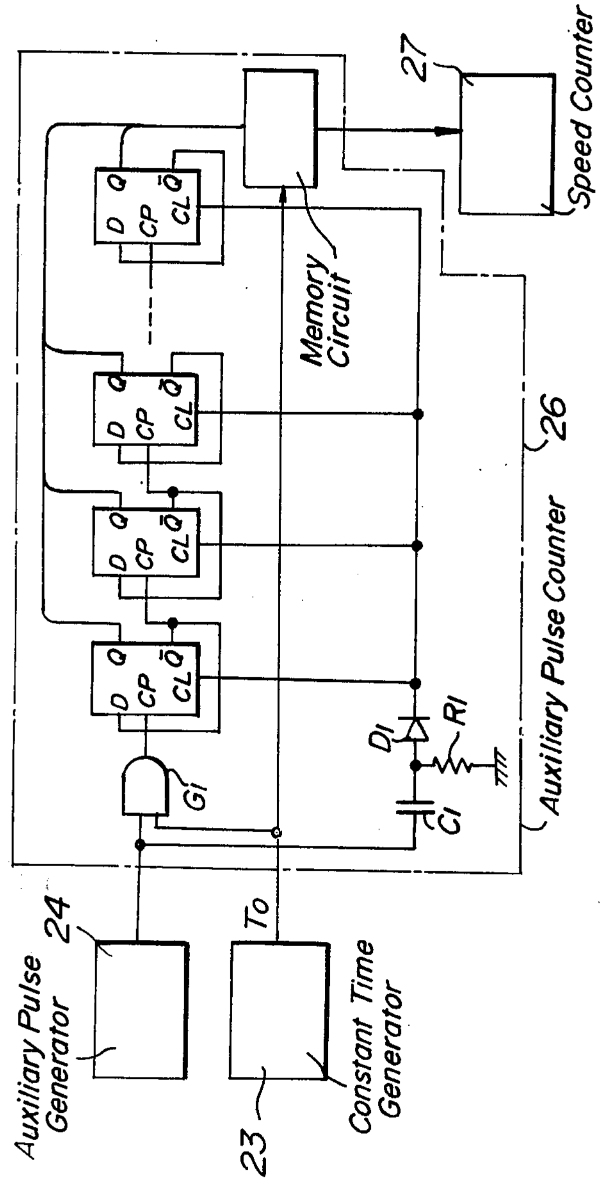
FIG. 9 is a schematic block diagram showing a construction of an auxiliary pulse counter for use in the speed control device.
Figure 10:
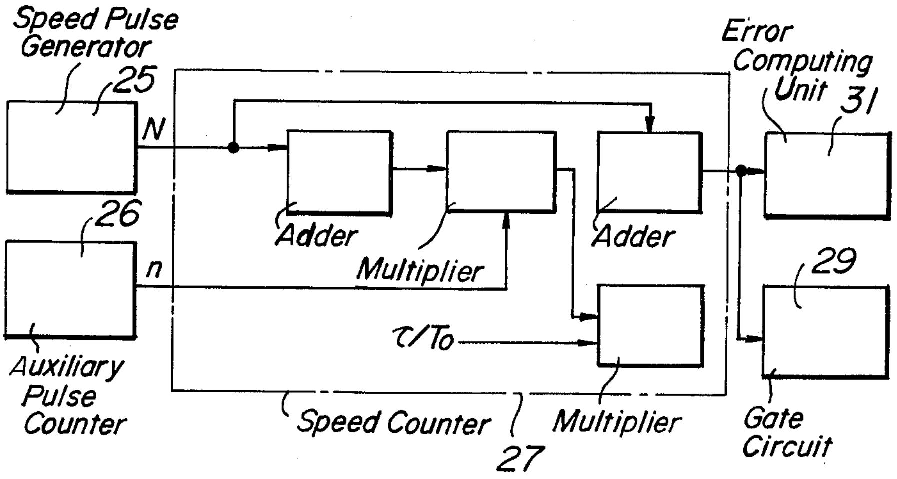
FIG. 10 is a schematic block diagram showing a construction of a speed counter for use in the speed control device.

The automatic speed control device shown in FIG. 2 is provided with a speed signal detector means for generating a speed pulse of a frequency proportional to the speed of an automobile, that is, a speed signal detector 21, a clock pulse generator means for generating clock pulses having a period smaller than the speed pulse period at the highest speed, that is, a clock pulse generator 22, a constant time generator means for generating a constant time ($T_0$) sufficiently longer than the speed pulse period at the lowest speed, that is, a constant time generator 23, and an auxiliary pulse generator means for generating an auxiliary pulse having period ($\tau$) sufficiently smaller than the speed pulse period at the highest speed, that is, an auxiliary pulse generator 24, whereby the clock pulse generator 22 supplies clock pulses to the constant time generator 23 and the auxiliary pulse generator 24. As shown in FIG. 5 the speed signal detector 21 comprises a lead switch 40, and a rotary magnet plate 41 placed near the lead switch. The speed signals are obtained by ON and OFF action of the lead switch which is operated by the ratation of the magnet plate. The constant time generator 23 and the auxiliary pulse generator 24 are constructed by a plurality of flip-flop circuits and an AND gate circuit, respectively, as shown in FIGS. 6 and 7. The begining of the constant time $T_0$ is synchronized with the leading edge of a speed pulse at the starting time of measurement. The automatic speed control device is also provided with a speed pulse counter means for counting speed pulses within a constant time, that is, a speed pulse counter 25, an auxiliary pulse counter means for counting auxiliary pulses of a constant period $\tau$ from the leading edge of each speed pulse, that is, an auxiliary pulse counter 26, an actual speed computing means for computing an actual speed from the counted result of speed pulse at the end of the constant time $T_0$ and the counted result of auxiliary pulse, that is, a speed counter 27, and a setting speed memory means for storing a setting speed. This setting speed memory means comprises a set switch 28, a gate circuit 29 and a speed memory 30, so as to open the gate circuit 29 by pushing the set switch 28 and to supply the signal representing the speed of an automobile at that time to the speed memory 30. The speed pulse counter 25 comprises a plurality of flip-flop circuits and a plurality of AND gate circuits which are connected as shown in FIG. 8. The auxiliary pulse counter 26 comprises a plurality of flip-flop circuits, an AND gate circuit and a memory circuit which are connected as shown in FIG. 9. The speed counter 27 comprises two adders and two multipliers which are connected as shown in FIG. 10.

Hereinafter, comparison of the computed actual speed with the stored setting speed is performed at a speed comparing means, that is, an error computing unit 31, but the operation of the actual speed will be explained in greater detail with reference to FIG. 3.

As described above, the speed pulse counter 25 is 0 at the leading edge of the constant time $T_0$, and counts 1, 2, . . . N from the next speed pulse, and temporarily maintains the counted content N at the end of the constant time $T_0$. The auxiliary pulse counter 26 is 0 at the leading edge of each speed pulse, counts 1, 2, . . . n from the next auxiliary pulse, and temporarily maintains the counted content n at the end of the constant time $T_0$.

Figure 3:
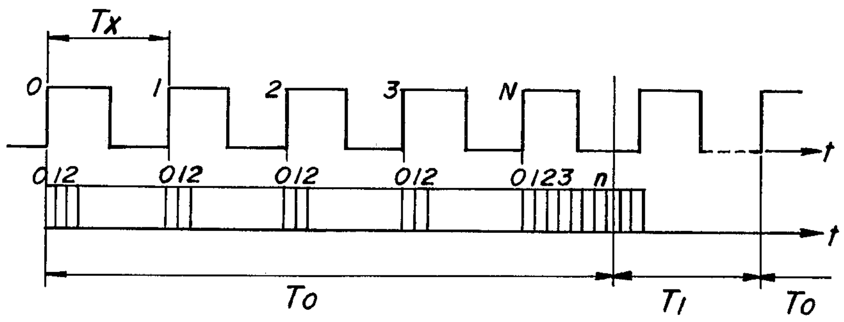
FIG. 3 is an explanatory view showing the synchronizing relation between speed pulses and auxiliary pulses in the device according to the present invention.

Let the period of the speed pulse be $T_x$ and the speed of the automobile be $V_x$, as shown in FIG. 3, it becomes $$T_0 = N \cdot T_x + n \cdot \tau \qquad (1)$$

Hence, $$T_x = \frac{T_0}{N}\left(1 - \frac{\tau}{T_0} n\right) \qquad (2)$$

and $$V_x = \frac{K}{T_x} = \frac{K \cdot N}{T_0}\left(1 - \frac{\tau}{T_0} n\right)^{-1} \qquad (3)$$

wherein K is a constant.

The above equation (3) includes division, so that it is not suitable for digital operation, and in order to operate the equation (3) by multiplication only, an approximation is obtained as follows.

$$V_x \div \frac{K \cdot N}{T_0}\left(1 + \frac{\tau}{T_0} n\right) \quad (4)$$

(In addition, in the equation (4), $K/T_o$ and $\tau/T_0$ are constant).

Here, an error of the equation (4) to the equation (3) is 0 in case of n=0, but becomes maximum when n is the maximum value and becomes discontinuous at the vicinity of the speed where $N \cdot T_x$ becomes equal to $T_0$, so that the stable control of the vehicle speed is damaged. Therefore, in order to make the error when n is the maximum value 0, $$\tau = \frac{T_0}{(N+1)} \cdot \frac{1}{n_0} \text{ (} n_0 \text{ is a constant) and}$$

$N >> 1$ for approximating the equation (3), and the following equation is obtained.

$$V_x \div \frac{k}{T_0}\left\{N + \frac{(N+1)\tau}{T_0} \cdot n\right\} \quad (5)$$

In this case, if $\tau/T_0 = 0.001$ and $N \geqq 5$, the error by the equation (5) is at most 0.83%, so that there is no problem even if the computing is performed with the use of the equation (5).

Thus, the computing of the actual speed is performed by the speed counter 27, and a difference between the actual speed and the stored setting speed is operated by the error computing unit 31. This computed result is supplied to an output signal generator 32, and in case that the difference between the actual speed and the setting speed is 0 for example, an output current of a conducting time ratio 50% is generated with a certain amplitude, a mean current is varied by decreasing or increasing the conducting time ratio in accordance with the positive or negative of the difference, a vacuum sorce 33, for example the vacuum of an intake manifold of a vehicle, is introduced, and a change of the current is converted into change of the vacuum by the current-vacuum converter 34. The change of the vacuum is converted into a change of suction force by the vacuum force converter 35 and a throttle valve 37 is driven through a link mechanism 36 by the change of driving force. In this case, if the actual speed is larger than the setting speed, the throttle valve 37 is driven in the direction of decreasing the actual speed, and in case contrary to the above, the throttle valve 37 is driven in the direction of increasing the actual speed, thereby running the vehicle at a constant speed. In addition, the setting speed is once cancelled by braking or the like, and thereafter stored at an optional speed by pushing the set switch 28.

Figure 4:
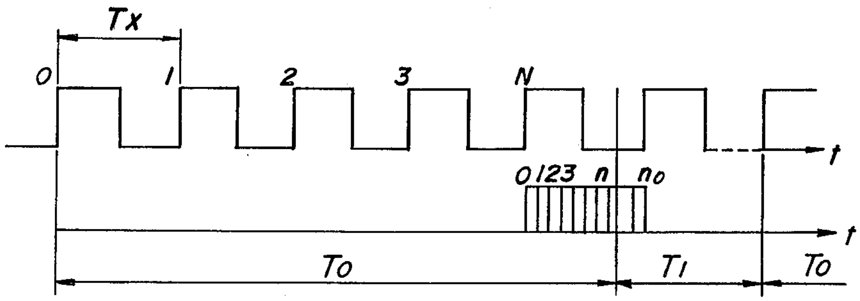
FIG. 4 is an explanatory view showing the synchronizing relation between speed pulses and auxiliary pulses in another embodiment of the device according to the present invention.
Figure 12:
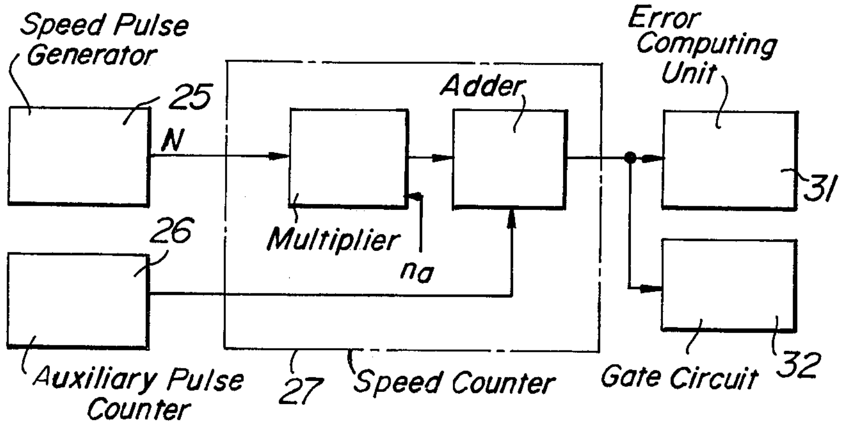
FIG. 12 is a schematic block diagram showing a construction of a speed counter for use in the another embodiment of the automatic speed control device.
Figure 11:
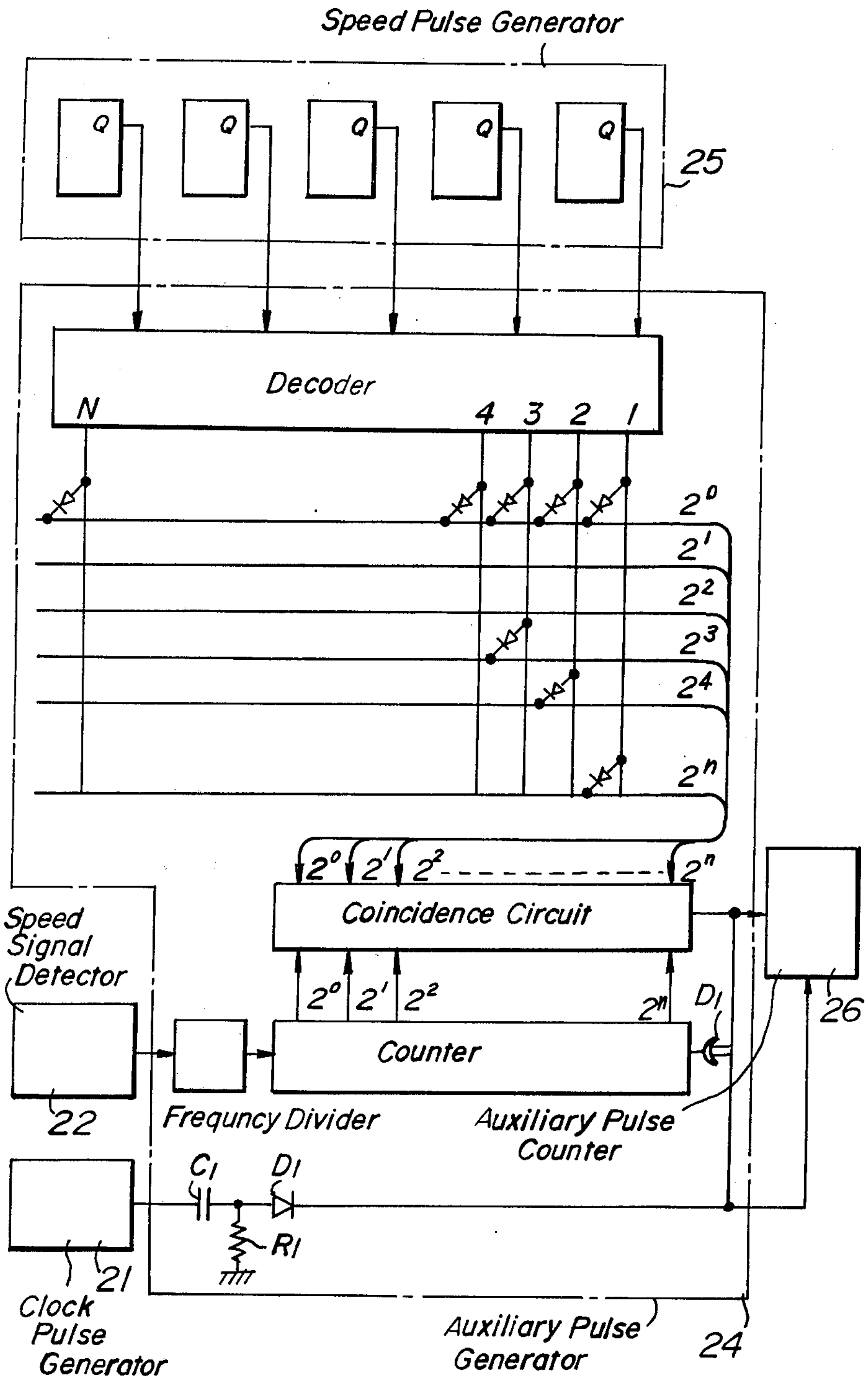
FIG. 11 is a schematic block diagram showing a construction of an auxiliary pulse generator for use in another embodiment of an automatic speed control device according to the present invention.

A second embodiment of the automatic speed control device according to the present invention is shown in FIGS. 2 and 4. In this embodiment the construction of the device is the same as that of the device shown in the first embodiment except for a connection of the auxiliary pulse generator 24 to the speed pulse counter 25 as shown in FIG. 2 by a dotted line. The auxiliary pulse generator means, that is, the auxiliary pulse generator 24 supplies auxiliary pulse having a period corresponding to the counted result of the speed pulses. The auxiliary pulse generator 24 comprises a decorder, a diode matrix, a coincedence circuit, a frequency divider, a counter and an OR gate circuit, which are connected as shown in FIG. 11. The auxiliary pulse counter means, that is, the auxiliary pulse counter 26 counts auxiliary pulse of a period corresponding to the counted content of the speed pulse counter 25. In this embodiment the speed counter 27 comprises an adder and a multiplier, which are connected as shown in FIG. 12. The other constructional elements of the speed control device are the same as those of the speed control device shown in the first embodiment so that the detailed explanation thereof is omitted.

The auxiliary pulse generator 24 generates auxiliary pulse having a period determined by following equation in accordance with counted content N of the speed pulse counter 25 and in synchronized with the leading edge of speed pulse.

$$\tau = \frac{T_0}{(N+1)n_0} \quad (6)$$

In the equation (6), $n_0$ is a constant integer, for example 16.

Let the period of the speed pulse be $T_x$ and the speed of the vehicle be $V_x$, as shown in FIG. 4, it becomes $$\begin{aligned} T_0 &= N \cdot T_x + \tau \cdot n \\ &= N \cdot t_x + \frac{T_0}{(N+1)n_0} \cdot n \end{aligned} \quad (7)$$

Therefore, $$T_x = \frac{T_0}{N}\left\{1 - \frac{n}{(N+1)n_0}\right\} \quad (8)$$

and then speed $V_x$ is obtained.

$$\begin{aligned} V_x &= \frac{K}{T_x} \text{ (} K \text{ is a constant)} \\ &= \frac{T \cdot N}{T_0}\left\{1 - \frac{n}{(N+1)n_0}\right\}^{-1} \end{aligned} \quad (9)$$

The above equation (9) includes division, so that it is not suitable for digital operation, and in order to compute the equation (9) by multiplication only, $$\frac{n}{(N+1)n_0} << 1 \text{ and } \frac{N}{N+1} \div 1$$

and an approximation is obtained as follows.

$$V_x \div \frac{K}{T_0}\left(N + \frac{n}{n_0}\right) \quad (10)$$

In this case, if $n_0 = 16$ and $N \geqq 5$, an error of the speed $V_x$ obtained by the equation (10) to the equation (9) is 0 in case of n=0 and n=16, but becomes maximum in case of n=8 and becomes at most 0.83% so that there is no problem even if the operation is performed with the use of the equation (10).

The function of other points is the same as that shown in the first embodiment so that the explanation thereof is omitted.

In the above embodiments, an electromechanical transducer means connected to the output signal generator 32 comprises a combination of the vacuum source 33, the current-vacuum converter 34, the vacuum force converter 35 and the link mechanism 36 thereby to finally drive the throttle valve 37, but it is a matter of course that the above embodiments are not limited to the aforementioned electromechanical transducer means. Moreover, in the construction for varying a speed by increasing or decreasing a fuel injection amount by rotating a plunger as in the diesel engine, if a control rack for rotating the plunger is connected to the link mechanism, it is possible to obtain a preferable stable speed control as well as the case of the gasoline engine.

As described above, according to the present invention, the process up to the computing of the difference between the actual speed and the setting speed is digitally treated, so that the accuracy is remarkably improved as compared with the conventional system, the above computing can fully be made with a general purpose 4-bit microcomputer mass-produced and sold at present, and an automatic speed control device having high reliability can be provided inexpensively. Moreover, the highest value of counted content n of the auxiliary pulses is determined by a constant and comparatively small integer $n_0$ so that the bit number of the counting mens can be made small.

What is claimed is:

1. An automatic speed control device comprising a speed signal detector means for generating speed pulses of a frequency proportional to a speed, a constant time generator means connected to the detector, a speed pulse counter means connected to the detector and the constant time generator for counting the speed pulse received within the constant time, an auxiliary pulse generator means connected to the speed signal detector and the speed pulse counter for generating auxiliary pulses of a constant period from the leading edge of each speed pulse, an auxiliary pulse counter means connected to the auxiliary pulse generator and the constant pulse generator for counting from the leading edge of each speed pulse auxiliary pulses of constant period sufficiently smaller than a period of the speed pulse at the highest speed, an actual speed computing means connected to both counters for operating an actual speed from the counted result of speed pulses at the end of the constant time and the counted result of the auxiliary pulses, a setting speed memory means connected to the actual speed computing means, a speed comparator means connected to the memory means and the actual speed computing means for comparing the actual speed and the setting speed thereby to generate an output signal corresponding to the difference thereof, and an electromechanical transducer means connected to receive the output signal of the speed computing means for driving an adjustable speed mechanism of a prime mover.

2. An automatic speed control device as claimed in claim 1, wherein the adjustable speed mechanism of the prime mover is a throttle valve of a gasoline engine.

3. An automatic speed control device as claimed in claim 1, wherein the adjustable speed mechanism of the prime move is a control rack of a diesel engine.

4. An automatic speed control device comprising a speed signal detector means for generating speed pulses of a frequency proportional to a speed, a constant time generator means connected to the detector, a speed pulse counter means connected to the detector and the constant time generator for counting the speed pulses received within the constant time, an auxiliary pulse generator means connected to the speed signal detector and the speed pulse counter for generating auxiliary pulses of a period corresponding to the counted result of the speed pulses, an auxiliary pulse counter means connected to the auxiliary pulse generator and the constant pulse generator for counting auxiliary pulses generated at a period corresponding to the counted result of the speed pulses, an actual speed computing means connected to both counters for operating an actual speed from the counted result of the speed pulses at the end of the constant time and the counted result of the auxiliary pulses, a setting speed memory means connected to the actual speed computing means, a speed comparator means connected to the memory means and the actual speed computing means for comparing the actual speed and the setting speed thereby to generate an output signal corresponding to the difference thereof, and an electromechanical transducer means connected to receive the output signal of the actual speed computing means for driving an adjustable speed mechanism of a prime mover.

5. An automatic speed control device as claimed in claim 4, wherein the adjustable speed mechanism of the prime mover is a throttle valve of a gasoline engine.

6. An automatic speed control device as claimed in claim 4, wherein the adjustable speed mechanism of the prime mover is a control rack of a diesel engine.

7. An automatic speed control device as claimed in claim 1, wherein the setting speed memory means comprises a set switch, a gate circuit and a speed memory, to open the gate circuit by pushing the set switch and to supply the signal representing the speed of vehicle at that time to the speed memory.

8. An automatic speed control device as claimed in claim 1, wherein the electromechanical transducer means comprises a combination of a vacuum source, a current-vacuum converter, a vacuum force converter and a link mechanism thereby to finally drive a throttle value.

* * * * *